Oct. 24, 1967 R. D. MULLEN 3,349,323
APPARATUS AND METHODS EMPLOYING MAGNETIC REED SWITCHES
AND STATIC AND VARYING BIAS FIELDS FOR
DETECTING MAGNETIC PHENOMENA
Filed Aug. 19, 1964
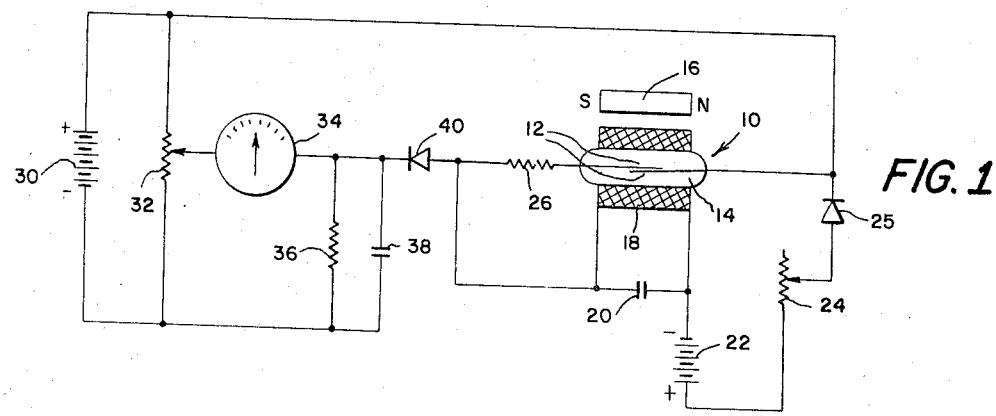
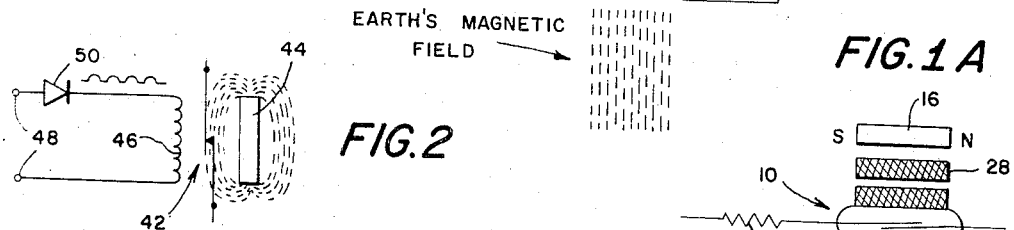
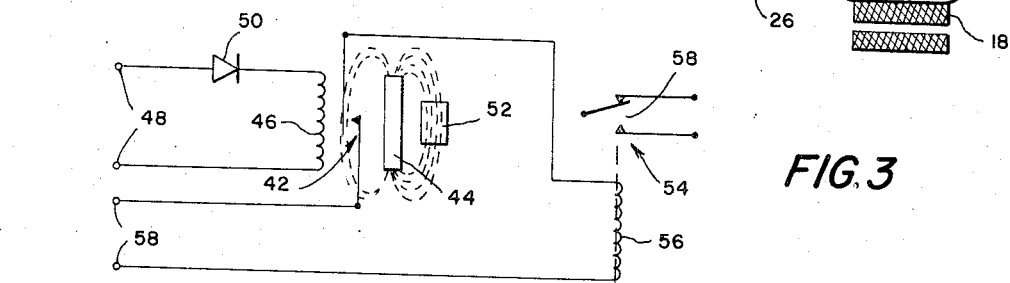
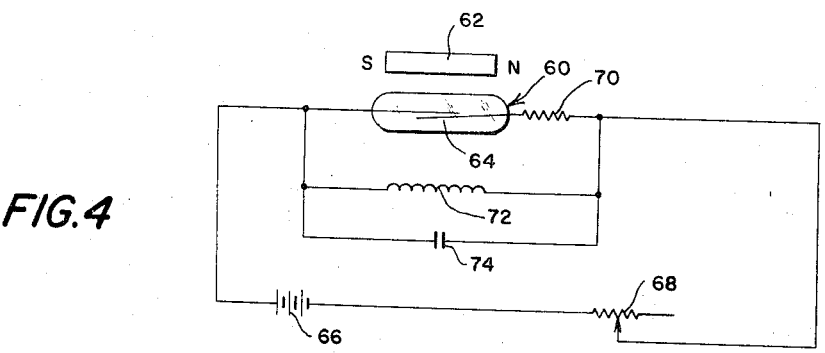
INVENTOR
ROBERT D. MULLEN
BY
ATTORNEY United States Patent Office 3,349,323
Patented Oct. 24, 1967

3,349,323
APPARATUS AND METHODS EMPLOYING MAGNETIC REED SWITCHES AND STATIC AND VARYING BIAS FIELDS FOR DETECTING MAGNETIC PHENOMENA
Robert D. Mullen, 7534 Wilbur Ave., Reseda, Calif. 91335
Filed Aug. 19, 1964, Ser. No. 390,701
13 Claims. (Cl. 324—43)

This invention relates to magnetic detection apparatus and methods and more particularly to apparatus and methods for sensing magnetic fields and the presence of magnetic objects.

Prior devices for sensing magnetic fields or magnetic objects are complex and/or have poor sensitivity. Frequently an amplifier is required in order to provide a useful output. Moreover, it has not been possible to produce a simple magnetic directional reference device with a continuous electrical output.

It is accordingly a principal object of the present invention to provide magnetic detection apparatus which is unusually simple in construction, which has high sensitivity, which produces a continuous electrical output without requiring amplification, and which employs readily available components.

Another object of the invention is to provide an improved direction sensor (for use in an auto-pilot system, for example), an improved indicating magnetic compass, an improved magnetic field detector, an improved sensor for magnetic objects (such as cans on a conveyor belt), and an improved sensitive relay.

Still another object of the invention is to provide apparatus of the foregoing type which may readily be made compact, lightweight, self-contained, and portable.

An additional object of the invention is to provide electrical apparatus which produces an output having a frequency which varies with the strength and/or orientation of a magnetic field or with the position of a magnetic object.

A further object of the invention is to provide improved methods of detecting magnetic field phenomena.

Briefly stated, and without intent to limit the scope of the invention, in one embodiment the invention comprises a magnetic reed switch having contacts which are held closed by the static bias flux of a permanent magnet and which are opened by the neutralizing varying bias flux of an electromagnet. The switch and the electromagnet are part of an oscillating or interrupter circuit which causes the contacts to open and close repetitively at a characteristic frequency. When the switch is subjected to an external magnetic field or when the holding flux of the permanent magnet is shunted by a magnetic object, the frequency of oscillation varies. The variation in frequency may be measured as an indicium of a condition to be sensed.

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein:

FIGURE 1 is a schematic diagram of a first embodiment of the invention;

FIGURE 1A is a partial schematic diagram of a modification;

FIGURE 2 is a schematic diagram of another embodiment of the invention;

FIGURE 3 is a schematic diagram illustrating a different condition of the apparatus of FIGURE 2 and illustrating a measuring circuit; and FIGURE 4 is a schematic diagram of still another embodiment.

The principles of the invention will be described initially with reference to apparatus for sensing a very weak magnetic field, and particularly with reference to magnetic direction sensing apparatus having a usable electrical output which varies as the alignment of the apparatus changes relative to the earth's magnetic field. Preferably the apparatus of the invention employs a switch of the well known dry reed type, for example as shown in FIGURE 1 of Patent #2,289,830, issued to W. B. Ellwood on July 14, 1942. Such a switch 10, illustrated in FIGURE 1, comprises contacts 12 in a gas-filled tubular envelope 14. The contacts are flexible magnetizable reeds supported from the ends of the envelope in aligned overlapping relationship and are spaced apart resiliently. The reeds are of low electrical and magnetic impedance and may be composed of any suitable material, such as pure iron or iron-nickel alloy. The envelope contains a non-corrosive gas, such as helium, neon, or argon. A permanent magnet 16, preferably of the ceramic type, is located adjacent to the reed switch and is oriented (preferably parallel to the axis of the switch) so that its magnetic flux is sufficient to close contacts 12, which would normally be open. A coil 18 is also located adjacent to the switch (preferably surrounding the envelope 14), and as will be seen hereinafter is arranged to create a magnetic flux which opposes the flux of the permanent magnet 16 and thus tends to permit the contacts 12 to open. Coil 18 is shunted by a condenser 20.

A stable source of electromotive force, such as a mercury battery 22, is connected in circuit with coil 18, condenser 20, and contacts 12. One terminal of the battery is connected through a rheostat 24 and a rectifier 25 to one of the contacts, the other contact being connected through a resistor 26 and through coil 18 and condenser 20 in parallel to the other terminal of the battery.

When the contacts 12 are closed, a circuit is completed from the battery 22, and the flux of the coil 18 gradually builds up in opposition to the flux of the magnet 16. The flux build-up is delayed by the R, C, and L parameters of the circuit, and especially by condenser 20 and resistors 24 and 26. Eventually a point is reached at which the intensity of the field of the coil 18 is sufficient to overcome the holding field of the magnet 16, and contacts 12 snap open. When this occurs, the energization circuit for the coil is broken, but the magnetic flux tends to be sustained for a period of time by virtue of the inductance of the coil and especially by the discharge of the capacitor through the coil. When the coil flux decays sufficiently, the contacts are snapped closed by the flux of the magnet 16, and the cycle is repeated. The result is a continuous and repetitive making and breaking of the switch contacts. The frequency of oscillation or interruption is determined by the values of the various R, C, and L components, by the battery voltage, and by the location and strength of the bias magnet. A frequency of about 5 cycles per second has been found to be satisfactory. Stability is achieved by the use of stable components, such as the ceramic magnet and the mercury battery.

If all the conditions within the circuit remain stable, then the frequency will remain constant unless the apparatus is disturbed by an external stimulus. For example, the apparatus may be made responsive to a weak magnetic field, such as the earth's magnetic field. The frequency of oscillation of the circuit will vary with the orientation of the apparatus (in particular the reed switch) with respect to the magnetic field to be detected. If the field to be detected assists the flux of the bias magnet, a greater flux strength of the coil will be required to overcome the flux holding the switch contacts closed, and the frequency of oscillation will decrease. If on the other hand the field to be detected opposes the flux of the bias magnet, less coil flux will be required to overcome the holding flux, and the frequency will increase. Thus the frequency of oscillation may be used as a measure of the strength of a magnetic field of given orientation and as a measure of the direction of a magnetic field of given strength. To provide a magnetic directional reference the apparatus (i.e., the axis of switch 10) is kept oriented in a direction which minimizes or maximizes the frequency of oscillation. The entire apparatus, or merely the switch, coil, and magnet, may be supported for variable orientation, for example, like a magnetic compass or directional gyro, and the orientation may be kept aligned with the earth's magnetic field by a conventional servo system responsive to the operating frequency.

The frequency will also increase if a ferrous object is brought close to the device, so as to divert or shunt some of the flux from the magnet. Thus the apparatus may be utilized for detecting the proximity of ferrous objects. Furthermore, the apparatus may be employed to detect small electric currents and may serve as a sensitive relay. As shown in FIGURE 1A, a second coil 28 may be located (e.g. surrounding coil 18) so as to affect the operation of the reed switch. The field produced by passing a current, such as a small D.C., through coil 28 will vary the frequency of oscillation, the effect depending upon the polarity.

The apparatus of the invention operates continuously to monitor or sense a desired condition and does not require resetting. A typical monitoring circuit for measuring the frequency of oscillation is illustrated in FIGURE 1. In the illustrative form this circuit comprises another battery, 30, connected across the terminals of a potentiometer 32, the tap of which is connected to one side of D.C. milliammeter 34. One terminal of the potentiometer is connected through contacts 12 to resistor 26, and the other terminal is connected to one side of a parallel R.C. network comprising a resistor 36 and a condenser 38. The other side of the network is connected to the remaining side of meter 34 and through a rectifier 40 to resistor 26. The charge on condenser 38 is a function of the frequency of oscillation, meter 34 being zeroed by adjusting potentiometer 32. The meter is merely illustrative of a device responsive to the operating frequency and may be replaced by a relay, for example, which trips when the potential across condenser 38 reaches a desired level.

FIGURES 2 and 3 illustrate a modification of the invention. In this embodiment a magnetic reed switch of the type previously described is indicated schematically at 42, a permanent magnet being shown at 44 and a coil at 46 (which may surround the switch). The magnet is placed so that its field is incapable of closing the contacts of switch 42, but once the contacts are closed the magnetic flux is just strong enough to maintain them closed. It is characteristic of the ordinary magnetic reed switch that more flux is required to close the contacts than to hold them closed. A source of pulsating D.C. potential is applied to coil 46, and the polarity of the coil is arranged so that the coil flux assists the flux produced by the permanent magnet. The pulsating potential may be obtained, for example, by applying 60 cycle A.C. to terminals 48 and by placing a rectifier 50 in series with the coil. The strength of the field produced by the coil is made sufficient to close the contacts of the reed switch. Once closed, the contacts are held closed by the permanent magnet under quiescent conditions. If now a ferrous body 52 (FIGURE 3) is moved into the vicinity of the permanent magnet so as to divert a portion of the flux therefrom, the flux of the magnet affecting the switch will be insufficient to hold the contacts of the switch closed. Thus the contacts will open and close repetitively under the influence of the coil 46. This condition may be sensed by a suitable monitoring circuit, such as a slow acting relay 54 having a coil 56 connected in series with the contacts of switch 42 and a source of D.C. potential at the terminals 58. Relay 54 will be energized when switch 42 is held closed but will de-energize and transfer its contacts 58 when switch 42 is pulsating.

The embodiment of FIGURES 2 and 3 may also be utilized to sense magnetic fields. For example, if the field to be sensed opposes the holding field of the permanent magnet, the magnet will not be able to maintain the contacts of switch 42 closed and the contacts will pulsate. The field to be sensed may be independent or may be produced by a current passing through a coil as in FIGURE 1A.

FIGURE 4 illustrates another embodiment of the invention wherein a magnetic reed switch 60 has a permanent magnet 62 arranged to maintain the contacts 64 closed but of insufficient strength to close the contacts initially. A battery 66 is connected in series with a rheostat 68, a resistor 70, and the contacts 64. A coil 72 (which may be wound about switch 60) is bridged by a capacitor 74 and is connected across the contacts 64 by means of resistor 70. When the flux produced by the coil 72 is sufficient to close the contacts 64, the contacts will be held closed by the magnet 62, and the coil and condenser will be shunted by the contacts in series with resistor 70. If now a ferrous object or a magnetic field sufficiently weakens the holding effect of magnet 62, contacts 64 will open, and after a time determined by the parameters of the circuit, the coil 72 will reclose the contacts, again shorting the coil and the condenser through the resistor 70. If the ferrous object or the additional field remains present, contacts 64 will open and close repetitively. The distinction between the pulsating contact condition and the closed contact condition may be sensed by any suitable means, such as a relay of the type illustrated in FIGURE 3.

To achieve high sensitivity it is desired that the contacts of the reed switch be maintained as long as possible in a condition in which they are just on the verge of opening. In the preferred forms of the invention wherein the contacts are held closed by the flux of a permanent magnet, it is desired that the field strength be just strong enough to maintain the contacts closed. This condition may be termed "starved magnetic hold-in." In the preferred continuous self-oscillating embodiments of the invention (e.g. FIGURE 1), a relatively low rate of oscillation is desired so as to increase the length of time that the reed switch is in its supersensitive or starved magnetic hold-in condition. Of course, reducing the oscillating frequency also reduces the response time, and the choice of operating frequency must take this into consideration.

While preferred embodiments have been shown and described, it will be apparent that changes can be made without departing from the principles and spirit of the invention, the scope of which is defined in the appended claims. For example, within the broader aspects of the invention, the bias magnet of FIGURES 2 and 3 may be reversed in polarity so as to oppose the field of coil 46 and just prevent the contacts from closing. The contacts would remain open until the field of the magnet affecting the switch were weakened by a ferrous shunt or a magnetic field, to permit the contacts to pulsate. This arrangement requires careful regulation of the coil voltage, however. Similarly, in the arrangement of FIGURES 2 and 3 the polarity of coil 46 may be reversed to oppose the holding field of the magnet. Switch 42 would then pulsate until the magnet were assisted by another field to hold the contacts closed. If the field strength of the magnet were made great enough to close the switch unassisted and were opposed by the field of coil 46, the switch could be made to remain closed until the effective field of the magnet were reduced by a ferrous object of another field, and then the contacts would pulsate.

In a modification of the embodiment of FIGURE 1, the frequency monitoring circuit may be isolated from the magnetic sensing circuit by using two switches like switch 10 arranged side by side in coil 18, one switch completing a circuit between the positive side of battery 30 and the junction of meter 34, resistor 36, and condenser 38, and the other switch performing as in the sensing circuit of FIGURE 1. The isolating diodes 25 and 40 would not be required.

Also within the broader aspects of the invention, switches having normally closed contacts could be employed. Such switches could be polarized by a polarizing field or could have magnetized contacts, for example. A permanent magnet could then be employed to hold the contacts open, for example, and the field strength could be chosen so that the contacts were just on the verge of closing. Moreover, the apparatus could be arranged so that the external stimulus affected the varying field rather than the constant field. Accordingly, the foregoing embodiments are to be considered illustrative, rather than restrictive of the invention, and those modifications which come within the meaning and range of equivalency of the claims are to be included therein.

What is claimed is:

1. Apparatus for measuring magnetic phenomena, comprising a switch having a pair of contacts which are normally in one position and which transfer to another position in response to a magnetic field, static bias magnetic field producing means fixed adjacent to said switch for transferring said contacts to said other position, varying bias magnetic field producing means fixed adjacent to said switch and periodically opposing said static bias field producing means and permitting said contacts to transfer to said one position, whereby said contacts transfer between said positions repetitively in accordance with the relative values of the fields produced by said static and varying field producing means, and means for detecting variation of the repetitive transfer of said contacts in response to a magnetic phenomenon which modifies said relative values.

2. The apparatus of claim 1, wherein said switch is a magnetic reed switch.

3. The apparatus of claim 1, wherein said contacts are normally open and said static bias magnetic field producing means comprises a permanent magnet for closing said contacts.

4. The apparatus of claim 3, wherein said varying bias magnetic field producing means comprises a coil coupled to said switch for periodically opening said contacts.

5. The apparatus of claim 1, wherein said static field producing means comprises means for producing a field which is just sufficient to transfer said contacts to said other condition in the absence of the field produced by said varying field producing means.

6. The apparatus of claim 1, wherein said varying field producing means comprises a source of DC, a coil, and said contacts connected in series, said coil being shunted by a capacitor and being magnetically coupled to said contacts.

7. The apparatus of claim 6, further comprising a resistor in series with said source, said coil, and said contacts.

8. The apparatus of claim 1, said detecting means comprising means for measuring the repetition rate at which said contacts are repetitively transferred.

9. The apparatus of claim 1, said switch being directionally sensitive and being movable to change its orientation relative to an external magnetic field to be detected.

10. The apparatus of claim 1, further comprising a coil magnetically coupled to said switch and having means for passing a current through said coil for producing said magnetic phenomenon.

11. A method of detecting magnetic phenomena, employing a switch having contacts which are normally in one position and which transfer to another position in response to a magnetic field, comprising applying a static bias magnetic field to said switch with a polarity urging said contacts to said other position, periodically applying a varying bias magnetic field to said switch with a polarity opposite to the first-mentioned polarity and permitting said contacts to transfer to said one position, whereby said contacts transfer between said positions repetitively in accordance with the relative values of said fields, exposing said switch to a magnetic phenomenon to be detected which changes the relative values of said fields, whereby the repetitive transfer of said contacts is modified, and indicating the modification.

12. A method of detecting magnetic phenomena, employing a switch having contacts which are normally in one position and which transfer to another position in response to a magnetic field, comprising applying a static bias magnetic field to said switch with a polarity tending to urge said contacts to said other position and of strength insufficient to transfer said contacts to said other position but sufficient to hold said contacts in said other position when transferred thereto, periodically applying a varying bias magnetic field to said switch with a polarity the same as the first-mentioned polarity and of sufficient strength to transfer said contacts to said other position, thereafter exposing said switch to a magnetic phenomenon to be detected which weakens the static bias magnetic field applied to said switch sufficiently to permit said switch to transfer to said one position periodically, and detecting the periodic transfer of said contacts.

13. A method of detecting magnetic phenomena, employing a switch having contacts which are normally in one position and which transfer to another position in response to a magnetic field, comprising periodically applying a varying bias magnetic field to said switch with a polarity tending to transfer said switch from said one position to said other position and of sufficient strength to transfer said contacts, applying a static bias magnetic field to said switch with a polarity opposing the first-mentioned polarity and of sufficient strength to prevent said varying bias magnetic field from transferring said contacts, thereafter exposing said switch to a magnetic phenomenon to be detected which reduces the strength of said static bias magnetic field applied to said switch and permits said contacts to transfer periodically in response to said varying bias magnetic field, and detecting the periodic transfer of said contacts.

References Cited
UNITED STATES PATENTS

| | | | |
|---|---|---|---|
| 1,292,279 | 1/1919 | Eisemann | 324—34 |
| 2,289,830 | 7/1942 | Ellwood | 200—104 |
| 2,302,874 | 11/1942 | Lion | 324—43 |
| 2,431,319 | 11/1947 | Ellwood | 335—154 |
| 2,461,202 | 2/1949 | Ellwood | 324—42 |
| 2,603,687 | 7/1952 | Giacoletto | 324—43 |
| 3,253,099 | 5/1966 | Hess | 335—179 |

RUDOLPH V. ROLINEC, *Primary Examiner.*

RICHARD B. WILKINSON, WALTER L. CARLSON, *Examiners.*

R. J. CORCORAN, *Assistant Examiner.*